(No Model.)

W. M. STEWART.
JOINT PACKING.

No. 590,345.  Patented Sept. 21, 1897.

Asbestos board impregnated with oil (Alternative) --- May coat disk with non-metallic powder such as soapstone Witnesses:
F. O. McCleary
A. M. Parkins Inventor:
W. M. Stewart,
by Seaver & Goldsborough
Attys.

UNITED STATES PATENT OFFICE.

WILLIAM M. STEWART, OF TROY, NEW YORK.

JOINT-PACKING.

SPECIFICATION forming part of Letters Patent No. 590,345, dated September 21, 1897.

Application filed July 3, 1896. Serial No. 598,018. (No model.)

*To all whom it may concern:*

Be it known that I, WILLIAM M. STEWART, a citizen of the United States, residing at Troy, in the county of Rensselaer and State of New York, have invented certain new and useful Improvements in Joint-Packings; and I do hereby declare the following to be a full, clear, and exact description of the invention, such as will enable others skilled in the art to which it appertains to make and use the same.

My invention relates to flexible or pliable packings for the joints of steam and hot-water pipes and analogous purposes, and has for its object to provide a more efficient packing for this purpose than has heretofore been obtainable, to obviate the objectionable deterioration of such packings under the action of the heat to which they are exposed, to prolong the life of the packings and permit the renewal of the joints by giving them the property of retaining their pliability under long-continued exposure to heat, and to furnish an article of manufacture at a reduced cost of production.

This packing is designed for use in flat sheets, or strips, rings, or disks cut from such sheets and applied between the flanges or in the joints of steam and hot-water pipes, cylinder-heads, steam-chest covers, and like situations, as a gasket-packing in contradistinction to piston-rod packings; and it consists, essentially, in a flexible or pliable sheet of asbestos impregnated with oil prepared, as hereinafter described, so that it will be soft enough when applied to conform closely to the surfaces of the meeting parts and will have the property of drying readily and hardening under the action of heat, but which, instead of becoming brittle or pliable as it hardens, will remain tough, strong, and tenacious.

Figure 1:
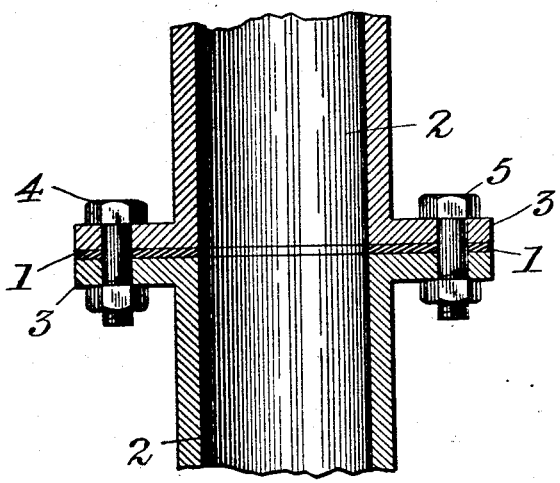
Figure 2:
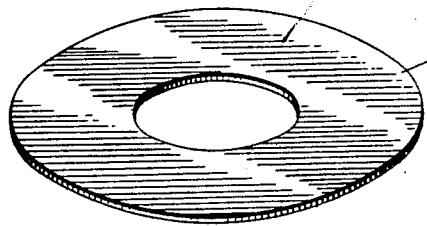

The accompanying drawings illustrate in Figure 2 a packing-ring of ordinary form made in accordance with my invention, and in Fig. 1 the application of the same to the joints of an ordinary steam or hot-water pipe.

In the figures the number 1 indicates the ring, 2 the steam or hot-water pipe, between the flanges 3 of which the packing is secured by bolts 4 in the ordinary manner.

In the production of my improved packing I take sheets of what is commercially known as "asbestos" mill-board, or if a very thin packing is desired I take asbestos sheathing. These sheets I first dampen with water and pass them between smooth rollers with considerable pressure to make both surfaces as smooth as possible, though if smooth sheets can be otherwise obtained this step in the process would not be necessary. I then dry the sheets and next thoroughly satuate or impregnate them with an oil prepared in the manner more particularly explained later on. This impregnation of the sheets may be obtained in any suitable way, as by coating with a brush, sprinkling, or by immersion in the oil, which last-named process I prefer for the reason that it effects the most thorough impregnation of the entire sheet.

I find it best to have the oil hot during the above step in the treatment, as it hastens the saturation or impregnation of the sheets. It is best also to raise the heat of the oil above the boiling-point of water, as this drives out any moisture that may remain in the sheets and allows the oil to take its place.

After the sheets have taken up as much oil as they will hold I allow the oil to cool and thicken, the sheets remaining in the oil meanwhile, and I then pass the sheets between rollers with light pressure to remove the excess of oil adhering to the surface of the sheets. I find that efficient rollers for this purpose may be obtained by covering ordinary smooth rollers of the desired size with a layer or winding of wire with the coils close together. In passing the sheets through such rollers small streaks of oil will be left corresponding to the recesses or creases between the coils; but these streaks almost immediately disappear and leave the sheets covered with an even film on the surface, the thickness of which is dependent upon the number and size of the creases on the roller-surfaces.

I do not, of course, desire or intend to be limited to the use of the rollers above described, as any other form or construction may be employed, and those above described form no part of my invention. Immediately after this roller treatment I hang the sheets on suitable racks to dry and preferably subject them during this part of the process to an elevated temperature of about 200° Fahrenheit; but this drying may be done at almost any temperature, though that described hastens and otherwise facilitates it. This practically completes the production of my packing; but the invention also contemplates the optional feature of coating the surface of the sheets with some non-metallic powder, such as pulverized soapstone, and if this is to be done the powder should be applied, preferably, by dusting it on the surface before it is thoroughly dry and while yet a little sticky.

After the sheets are thoroughly dried, as above explained, and after coating with the powder, if that is to be done, they are ready for the market and may be sold in this sheet form to be cut up by the users into such shapes as they desire, or they may be cut into disks, rings, strips, or any of the other conventional forms of gasket-packing and sold to the trade in this way.

I am aware that flat gasket-packings are not new, and I am also aware that such packings have been coated and saturated with oleaginous waterproof compounds. These compounds are, however, objectionable, for the reason that they only imperfectly withstand the action of heat and the packings soon become hard and brittle, so that they disintegrate, crack, and break when any attempt is made to renew the joint, and as they for the most part contain rubber in various proportions they soon rot out and allow the joints to leak.

It is to obviate these difficulties and objections that my invention has in view, and the gist of the invention lies in treating the foundation of the packing—viz., the asbestos sheets—in the manner above described with an oil so prepared that it will have the property of drying out hard without becoming brittle or friable and that will retain permanently its pliability, strength, and toughness, so that it will not rot or be disintegrated when subjected to the high degrees of heat to which such packings are usually exposed and so that the joints of the pipes may be opened and renewed without requiring new packings.

The best mode of preparation for the oil at present known to me is as follows: I take ordinary raw linseed-oil and raise it to a temperature of between 500° and 700° Fahrenheit, at which temperature it is maintained for several hours. At a convenient time in this process, to be determined by the condition of the oil and the skill and judgment of the manipulator, I add carbonate of soda in about the proportion of twenty grains of soda to one pint of oil, meanwhile preferably stirring or agitating the mass to insure a perfect intermixture of the ingredients. Continuing this process the oil becomes quite thick and dark in color, its nature changes entirely, and it becomes a varnish-like viscous substance that when dried somewhat resembles rubber in so far as it has the property of pliability and elasticity, but having none of the objectionable features of the same when exposed to high temperatures. The oil being prepared as thus explained, the asbestos or other sheets are treated as before described, and the dried packing is then ready to be put on the market as a new article of manufacture and sale.

Having thus described my invention, what I claim, and desire to secure, is—

As a new article of manufacture, a dried gasket-packing for the joints of steam and hot-water pipes, and like purposes, the same consisting of a sheet of asbestos board, saturated or impregnated with an oil prepared in the manner described so that it will be soft enough when applied to conform closely to the surfaces, and which, as it hardens under the action of heat after it has been applied, remains pliable and retains its toughness, strength and tenacity.

In testimony whereof I affix my signature in presence of two witnesses.

WM. M. STEWART.

Witnesses:
 EDGAR GARDNER BERNARD,
 FRED W. BARRY.